UNITED STATES PATENT OFFICE.

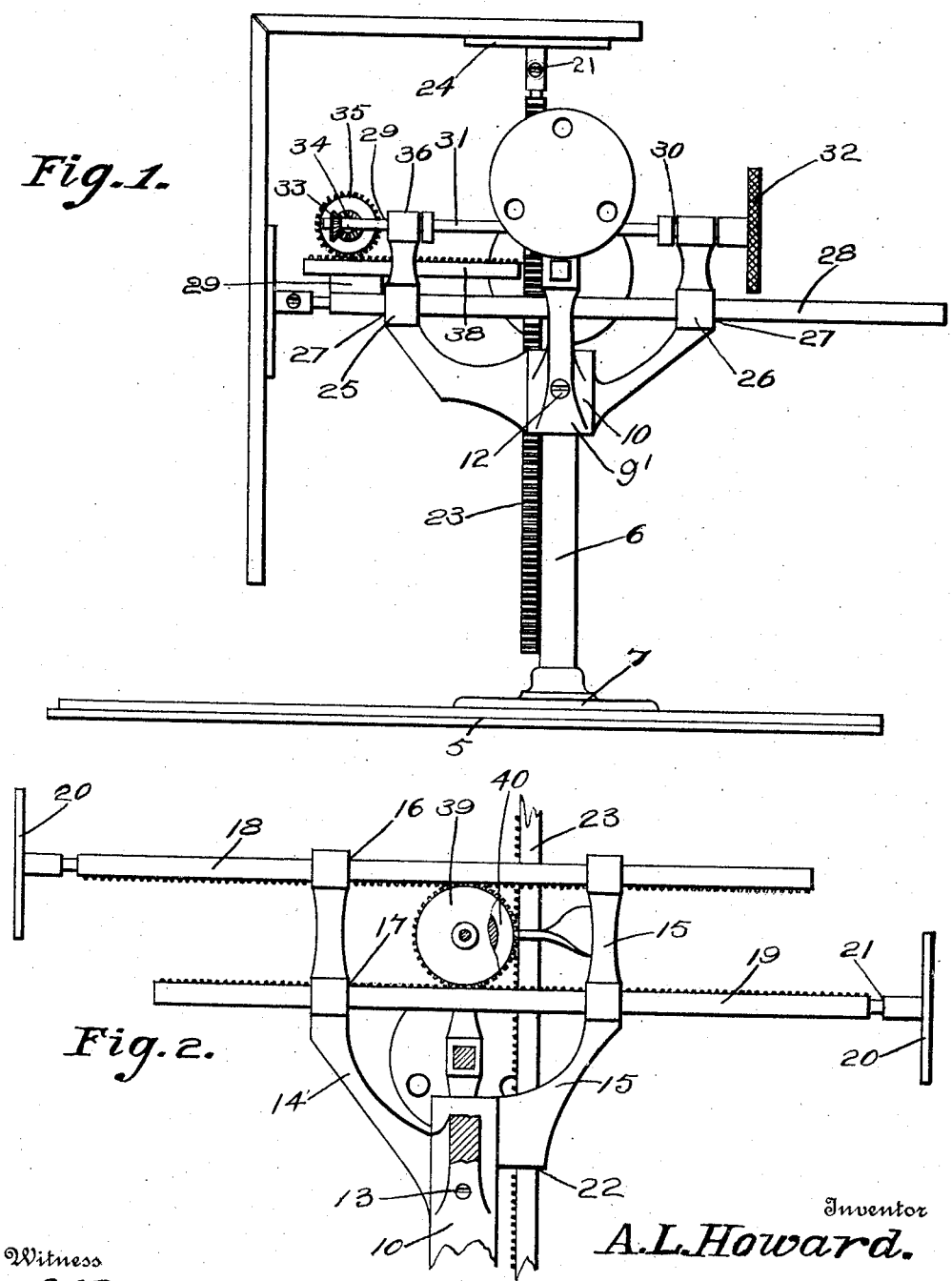

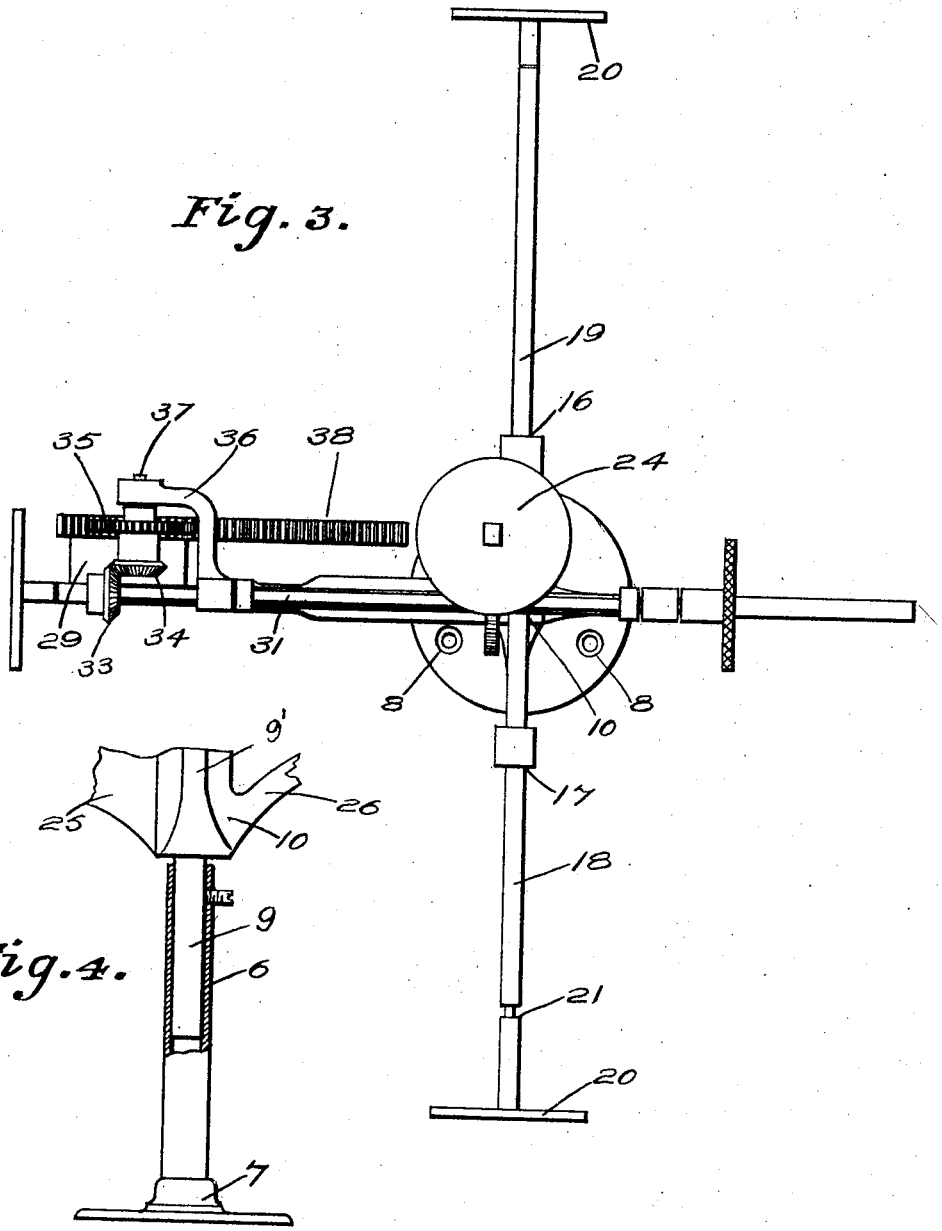

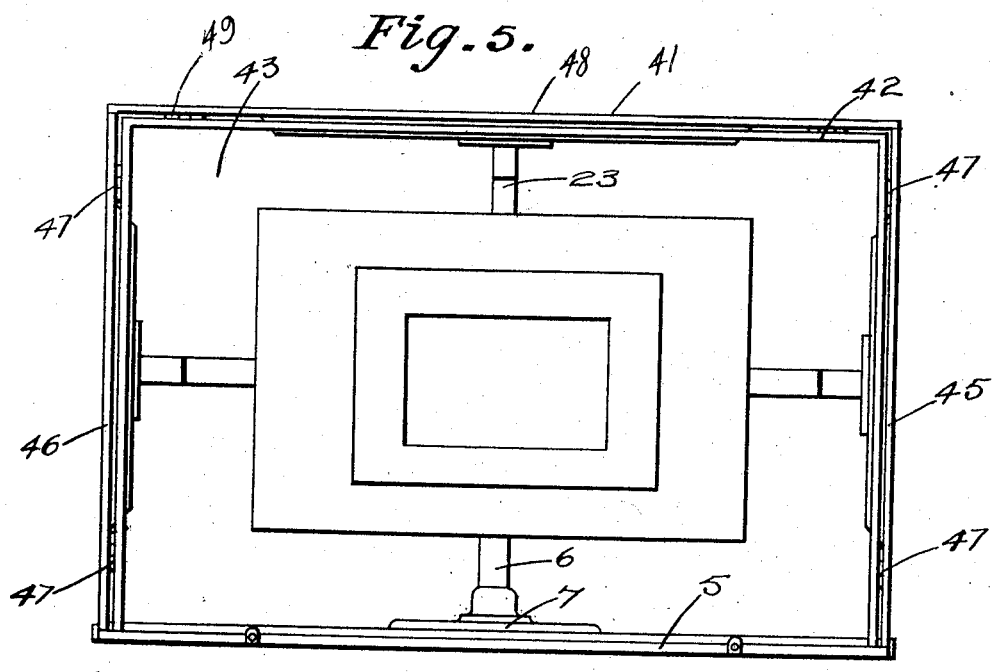
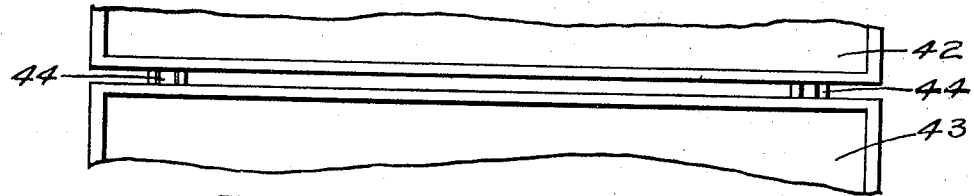
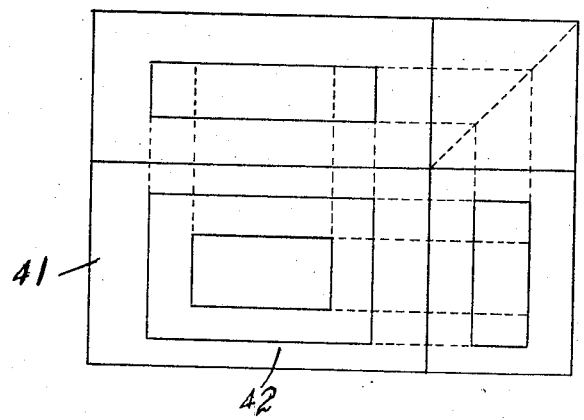

ALBERT L. HOWARD, OF MONTELLO, MASSACHUSETTS.

APPARATUS FOR TEACHING PROJECTION.

1,327,474.   Specification of Letters Patent.   Patented Jan. 6, 1920.

Application filed October 3, 1919. Serial No. 328,095.

*To all whom it may concern:*

Be it known that I, ALBERT L. HOWARD, a citizen of the United States, residing at Montello, in the county of Plymouth and State of Massachusetts, have invented a new and useful Apparatus for Teaching Projection, of which the following is a specification.

This invention has reference to educational appliances, and more particularly to devices employed in drawing classes, for demonstrating methods of mechanical projection.

The primary object of the invention is to provide means for supporting objects, or photographs, whereby the same, together with their lines of projection may be traced onto transparent surfaces which surfaces are hingedly connected together to permit the same to be folded outwardly to form a substantially flat surface, bringing the surfaces in proper relation to each other to correctly illustrate the relation of the lines of projection of one surface of an object, to another.

A further object of the invention is to provide a device of this character which may be revolved whereby the same may be observed from various locations, in a class room.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:—

Figure 1 illustrates a side elevational view of the interior of the device, showing the outer casing as removed.

Fig. 2 illustrates a fragmental elevational view partly broken away, of the interior construction.

Fig. 3 illustrates a plan view of the same.

Fig. 4 illustrates a fragmental view of the support, the same being shown partly in section.

Fig. 5 is a side elevational view of the device showing the outer casing positioned, ready for operation.

Fig. 6 is a detailed fragmental view disclosing the hinged connection between the sections of the outer casing, and Fig. 7 illustrates a plan view of the outer casing, and when in its extended position to illustrate the relation of one line to another.

Referring to the drawings in detail, the reference character 5 designates the base of the device which is constructed of suitable material, has a groove formed adjacent its edges to provide a seat, for a sectional glass cover, to be hereinafter more fully described.

Disposed substantially centrally of the base 5, is a supporting tube 6, provided with a circular base member 7, secured to the base 5, by means of the screw members 8, and in which tube 6 is supported the rod 9, the upper end thereof terminating in a head 9' forming a support for the opposed bracket member 10, secured thereto, by the screw members 12 and 13.

On opposite sides of the head 9' are the upwardly extending bracket members 14 and 15, the upper portion of each of the bracket members being provided with the spaced openings 16 and 17, the openings of one bracket being in alinement with the openings of the opposite bracket, for receiving and supporting the horizontally disposed rack bars 18 and 19, respectively, each of which as shown, is provided with a removable head 20, which heads are supplied with openings 21, through which extend screws, for securing the sections of the inner box thereto.

The bracket member 15, is also provided with a vertical opening 22, forming a support for the vertically operating rack bar 23, having the head 24, supported thereon, which head 24, also supports one of the sections of the inner box.

Secured to the opposite sides of the head 9' are the bracket members 25 and 26, each of which being provided with a square opening 27, to receive the horizontally operating rod 28, which is also square in cross section, whereby rotary movement of rod 28, with relation to the bracket, supporting the same is prevented.

Each of the brackets 25 and 26 extend upwardly, and are provided with openings 29 and 30, in which the operating rod 31, is positioned to revolve, by rotary movement of the operating head 32, positioned on one end thereof.

The opposite extremity of the operating rod 31, is provided with a beveled gear 33 meshing with the beveled gear 34, formed integral with the pinion 35 supported on the bracket 36, forming a part of the bracket 25, through the medium of the shaft 37. This pinion 35 coöperates with the rack bar 38, disposed in a horizontal plane, the forward end thereof, bearing connection with the rod 28, through the bracket 29, whereby movement of the rack bar 38, produces a relative movement of rod 28.

Secured to the operating rod 31, to operate therewith, are the pinions 39 and 40, the pinion 39 coöperating with the rod bar 18 and 19 while the pinion 40 coöperates with the vertically operating rack bar 23 for moving the rack bar 23 with relation to the remaining rack bars.

A glass cover, or outer casing 41, forming an important feature of the present invention and includes the top glass, section 42, hinged to the front glass member 43 as at 44, to swing vertically and the end members 45 and 46, hinged to the front member 43 to swing in a vertical plane as at 47.

When the device is in its assembled position, the cover 41; incloses the sections of the inner sectional box for supporting photograph drawings or objects between the inner walls of the glass casing 41 and the sections of the inner box, to permit the objects, supported thereby to be readily traced through the glass.

If it is desired to ascertain the lines of projection of a block having a central opening it is necessary to position a photograph, of say a front elevation of the block adjacent one of the walls of the glass frame and an end view adjacent the top or upper wall of the glass frame, and a side elevational view adjacent and of the end glass of the outer frame.

A student, is now directed to trace the lines of the photograph onto the glass walls positioned adjacent thereto. After the lines of the various views have been traced, the glass casing is unfolded, to lie in a position as indicated by Fig. 7 of the drawings, and the corner glass insert positions to occupy the space formed at the right have upper corners of the unfolded frame, the lines of projection of one view, with relation to the other views, may be taken off.

I claim:

1. In a device for illustrating mechanical projection, an inner member including movable rods, each of said rods supporting a box section, an outer transparent box like structure, and means for moving the rods for moving the box sections into engagement with the outer box like structure.

2. In a device for illustrating mechanical projection, an inner member including horizontally and vertically movable rods, means on one end of each of the rods for securing a box section thereto, said box sections having beveled edges, an outer box like member adapted to house the inner member, and means for moving the box sections into engagement with the inner wall of the outer box like member.

3. In a device for illustrating mechanical projection, an inner member including movable rods, a box section carried on each rod, a transparent outer box member including a plurality of pivoted sections, and means for moving the rods into engagement with the outer box member.

4. In a device for illustrating mechanical projection, an inner member including a support, horizontally and vertically movable rods on the support, means for moving the rods simultaneously, a box section carried by each rod, a base on which the support is mounted, said base having a groove formed adjacent its edges, and an outer transparent member positioned on the base, and having its edges disposed within the groove, for housing the inner member.

5. In a device for illustrating mechanical projection, an inner member including movable box sections, an outer transparent member adapted to house the box sections, and means for moving the movable box sections simultaneously into engagement with the outer transparent member.

In testimony that I claim the foregoing as my own I have hereto affixed my signature in the presence of two witnesses.

ALBERT L. HOWARD.

Witnesses:
 CLIFFORD L. WARD,
 A. E. PORTER.